United States Patent [19]

Hagberg

[11] 4,297,740
[45] Oct. 27, 1981

[54] PROTECTIVE RELAYING APPARATUS

[75] Inventor: John E. Hagberg, Mountain Lakes, N.J.

[73] Assignee: Westinghouse Electric Corp., Pittsburgh, Pa.

[21] Appl. No.: 9,012

[22] Filed: Feb. 5, 1979

[51] Int. Cl.³ .............................................. H02H 3/28
[52] U.S. Cl. ...................................... 361/67; 361/82; 361/84
[58] Field of Search ...................... 361/67, 68, 62, 64, 361/78, 82, 84–87; 307/127; 324/86, 108

[56] References Cited

U.S. PATENT DOCUMENTS

| 2,516,025 | 7/1950 | Sunnemann | 361/82 X |
| 3,673,425 | 6/1972 | Plichta | 361/82 X |

OTHER PUBLICATIONS

"Operational Amplifier Circuits for Relay Applications" by R. W. Gonnam, May 22, 1975, Westinghouse.
"Low Burden Sensing Units for Directional Comparison Systems" by Hinman et al., Apr. 12, 1976, Westinghouse.
IEEE Transactions on Power Apparatus and Systems, vol. PAS-90, No. 3, May/Jun. 1971, pp. 1190-1200.
Westinghouse Instruction Leaflet 41-1107 Akcwa "Type Sig-1H, Positive Sequence Restrained Ground Overcurrent Relay."

Primary Examiner—Patrick R. Salce
Attorney, Agent, or Firm—D. R. Lackey

[57] ABSTRACT

A protective relaying system for detecting and clearing high impedance faults on a polyphase electrical distribution circuit. First and second ratio ground relays are located at first and second circuit breakers, respectively. The first circuit breaker is located at the substation, and the second circuit breaker is remote from the substation, usually operating with a reclosing relay. A zero sequence directional relay, located at the second circuit breaker, coordinates the ratio ground relays by adjusting the trip delay time of the second circuit breaker according to the flow direction of a zero sequence quantity at the second circuit breaker.

8 Claims, 6 Drawing Figures

4,297,740

PROTECTIVE RELAYING APPARATUS

This is a continuation of application Ser. No. 868,789, filed Jan. 12, 1978, now abandoned.

BACKGROUND OF THE INVENTION

1. Field of the Invention

The invention relates in general to protective relay apparatus for electrical power systems, and more specifically to protective relay apparatus for detecting and clearing high impendance faults on a polyphase distribution circuit.

2. Description of the Prior Art

A low impedance fault on a polyphase distribution circuit is detected by conventional overcurrent relay techniques, with the fault being quickly isolated by tripping the proper circuit breaker or circuit breakers. A high impedance fault, however, such as might be caused by a broken or fallen conductor which does not result in a ground fault condition, will not be detected by the overcurrent relay apparatus. It would be desirable to provide a new and improved protective relay system which will detect and clear such high impedance faults. However, the more sensitive ground fault protection must not result in undesired tripping due to normal unbalanced load currents.

SUMMARY OF THE INVENTION

Briefly, the present invention is a new and improved protective relay system for polyphase electrical distribution circuits, which provides more sensitive ground fault protection, detecting and isolating high impedance faults due to fallen and broken conductors, without undesired tripping due to unbalanced load currents. The new and improved relay system utilizes first and second ratio ground relays located at first and second circuit breakers, respectively. The ratio ground relay is a new protective relay developed specifically for the new and improved relay system. The first circuit breaker is located at the distribution substation, and the second circuit breaker is located in the distribution circuit. Undesired tripping due to unbalanced load current is provided by setting the ratio ground relays such that they will only initiate trip timing when the residual or ground current exceeds a predetermined minimum magnitude. Further, the level of the residual current required to initiate trip timing is increased by the magnitude of a predetermined phase current related quantity, such as a line or phase current, or by the magnitude of the positive sequence component of the line currents, as desired.

The relay system further includes a zero sequence directional relay at the second circuit breaker, to determine the location of the high impedance fault. The time delay required to trip the first circuit breaker is T1, with the zero sequence directional relay selecting a time T2, which is shorter than T1, or a time T3, which is longer than T1, according to the flow direction of a zero sequence quantity at the second circuit breaker. If the flow direction indicates an open conductor or high impedance fault on the load side of the second circuit breaker, the zero sequence directional relay selects time T2, and the second circuit breaker trips before the first circuit breaker. If the open conductor or fault is on the source side of the second circuit breaker, time T3 is selected, to allow the first circuit breaker to trip.

BRIEF DESCRIPTION OF THE DRAWING

The invention may be better understood, and further advantages and uses thereof more readily apparent, when considered in view of the following detailed description of exemplary embodiments, taken with the accompanying drawings in which.

DESCRIPTION OF PREFERRED EMBODIMENTS

Figure 1:
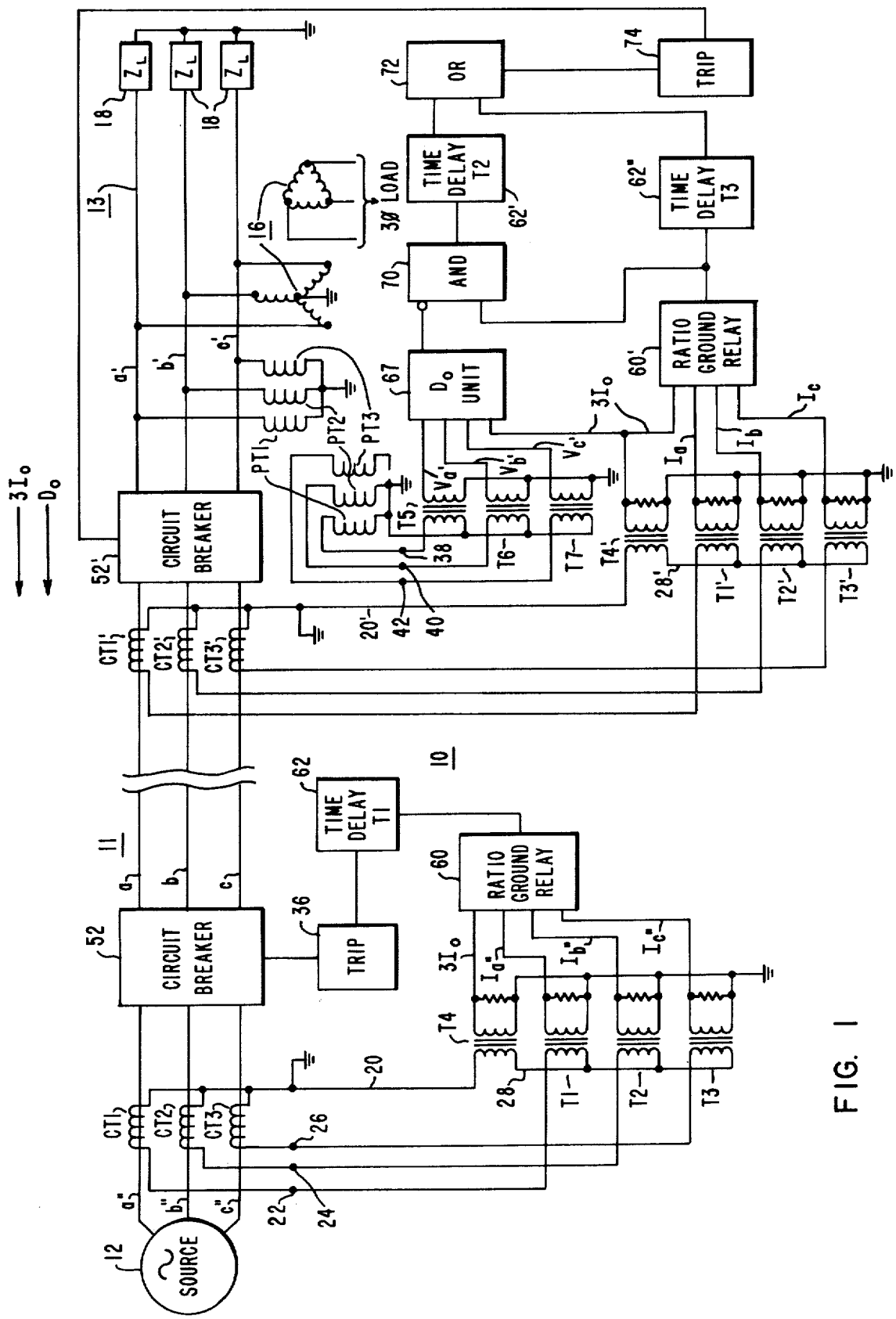
FIG. 1 is a partially schematic and partially block diagram of a new and improved protective relay system constructed according to the teachings of the invention.

Referring now to the drawings, and to FIG. 1 in particular, there is shown a protective relay system 10 constructed according to the teachings of the invention. Relay system 10 is associated with a polyphase distribution system or circuit which includes a first line section 11 having a plurality of conductors a, b and c, and a second line section 13 having conductors a', b' and c'. The first line section 11 is connected to a polyphase source 12 of alternating potential via a first circuit breaker 52 and conductors a", b" and c". The first line section 11 is connected to the second line section 13 via a second circuit breaker 52'. The second circuit breaker 52' may be associated with a reclosing relay (not shown), and may thus be referred to as recloser 52'. The second line section 13 is associated with one or more wye-delta transformers connected between the line conductors a', b' and c' and a three-phase load, such as transformer 16. The remaining loads on line section 13 are illustrated generally at 18.

Circuit breaker 52 is located at a substation, and recloser 52' is located out on the distribution circuit closer to the load. Relay system 10 protects line sections 11 and 13, detecting high impedance faults due to fallen or broken conductors which do not result in a fault current of sufficient magnitude to be detected by the normal overcurrent relay protection on the system.

Relay system 10 includes first and second ratio ground relays 60 and 60', located at the first and second circuit breakers 52 and 52', respectively. Ratio ground relay 60 is responsive to the zero sequence current (residual or ground current), also referred to as $3I_o$, flowing at circuit breaker 52, and to the phase or line currents flowing in conductors a", b" and c". Signals responsive to the phase currents are provided by a plurality of current transformers CT1, CT2 and CT3, which have their primary windings energized in accordance with the phase currents in conductors a", b" and c". The secondary windings of transformers CT1, CT2 and CT3 are wye connected between a neutral conductor 20, which may be grounded as shown, and output terminals 22, 24 and 26. The output currents from current transformers CT1, CT2 and CT3 may be further stepped down and changed to voltage signals via transformers T1, T2 and T3, which have their primary windings wye connected between a neutral conductor 28 and output terminals 22, 24 and 26. The neutral conductor 28 is connected to neutral conductor 20 via the primary winding of a ground current transformer T4. Resistors are connected across the secondary windings of transformers T1, T2, T3 and T4, providing voltage signals $I_{a''}$, $I_{b''}$, $I_{c''}$ and $3I_o$ responsive to the phase and zero sequence currents.

Since signals $I_a$, $I_b$, $I_c$ and $3I_o$ may be provided in the same manner for the second ratio ground relay 60', the current transformers for providing these signals are given like reference numerals with a prime mark, and will not be described in detail.

Figure 2:
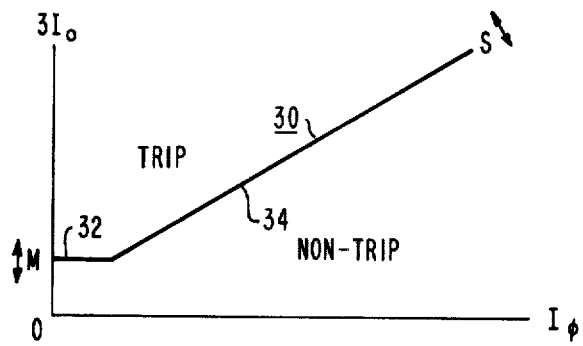
FIG. 2 is a graph which illustrates the operating characteristic of the ratio ground relays shown in FIG. 1.

FIG. 2 is a graph which illustrates the operating characteristic of the ratio ground relays 60 and 60'. FIG. 2 plots the current $3I_o$ on the ordinate and the phase current $I_\phi$ on the abscissa. Relays 60 and 60' are set to operate on a predetermined minimum magnitude M of current $3I_o$, with the level required to initiate a trip signal for initiating timing being increased by the phase current according to the ratio setting S selected on the relay. The selected settings of M and S determine the location of the curve 30, which has an initial horizontal portion 32 determined by the magnitude of M, and a portion 34 determined by the magnitude of S. The ratio S may be applied to reduce the phase current, in which case S will be less than 1, or it may be applied to increase the $3I_o$ current, in which case S will be greater than 1. If the $3I_o$ current magnitude for a given phase current is above curve 30, the relay provides a trip signal which initiates trip timing.

For purposes of example, M may be about 2½ to 5% of the normal phase relay minimum trip setting. The magnitude of S may be set to about 25 to 40% of the line current.

The magnitude of the current $3I_o$ may be separately compared with each phase current, or the three phase currents may be processed to provide the positive sequence current component, which is compared with the $3I_o$ current. A trip signal is issued when any comparison falls within the trip range of the operating characteristics shown in FIG. 2.

A trip signal provided by ratio ground relay 60 energizes a time delay circuit 62, such as Westinghouse Electric Corporation's TD-5 shown in published I.L. 41-579.1K. If the conditions which cause the ratio ground relay 60 to provide a trip signal persist for the time delay setting T1 of a time delay circuit 62, circuit 62 will provide a signal for a trip circuit 36 of circuit breaker 52, causing circuit breaker 52 to trip and open its contacts, to isolate both line sections 11 and 13 from source 12.

The second ratio ground relay 60' associated with the second circuit breaker 52 is coordinated with the first ratio ground relay 60 by a zero sequence directional relay 67. Relay 67 is located at the recloser 52' and is responsive to the flow direction of a zero sequence component at the second circuit breaker, such as zero sequence current, or zero sequence power. Relay 67 determines if a fault detected by the ratio ground relay 60' is on the source side of the recloser 52', or on the load side. In other words, is the fault in line section 11, or is it in line section 13? The directional relay 67 obtains a signal responsive to the line voltages via potential transformers PT1, PT2 and PT3. These potential transformers have their primary windings connected in wye, to the conductors a', b' and c' of line section 13, with the neutral being grounded. Their secondary windings are connected in wye to terminals 38, 40 and 42, with the neutral being grounded. Another stage of voltage transformation may be provided by transformers T5, T6 and T7, which have their primary windings connected in wye to terminals 38, 40 and 42, and the neutral grounded. Their secondary windings are connected in wye to the directional relay 67, to provide voltage signals $V_{a'}$, $V_{b'}$, and $V_{c'}$ responsive to the line voltages a', b' and c', respectively. The neutral is grounded.

Directional relay 67 is also responsive to a signal voltage responsive to the current $3I_o$, which signal may be obtained from transformer T4'.

Directional relay 67 sums the voltages $V_{a'}$, $V_{b'}$ and $V_{c'}$. If the voltages are balanced, the sum will be zero. If they are unbalanced, the sum indicates the zero sequence voltage component, which is phase compared with the voltage $3I_o$ responsive to the zero sequence component of the current. The algebraic sign of the phase angle comparison indicates the direction of the fault from the location of the relay.

The output of directional relay 67 is applied to an AND gate 70 which has an inverting input and a non-inverting input. The output of directional relay 67 is applied to the inverting input, and the output of the ratio ground relay 60' is applied to the non-inverting input. The output of AND gate 70 is applied to a time delay circuit 62', which has a time delay T2 selected to be less than the time T1 associated with time delay 62.

The output of ratio ground relay 60' is also applied to a time delay circuit 62" which has a time delay T3 selected to be greater than the time T1 associated with time delay 62. The time delay magnitudes must be selected to coordinate with the overcurrent devices of the circuit breaker, reclosers, fuses, etc. In other words, the time delays must be long enough to enable overcurrent protective devices to operate. For purposes of example, time T1 may be 10 seconds, time T2 may be 8 seconds, and time T3 may be 12 seconds.

The outputs of time delay circuits 62' and 62" are applied to the inputs of an OR gate 72, and the output of the OR gate 72 is applied to a trip circuit 74. Trip circuit 74 trips circuit breaker 52' to isolate line section 13 from line section 11 and from the source 12, when it receives an appropriate signal from OR gate 72.

With the logic circuitry shown in FIG. 1, directional relay 67 is arranged to look back towards the source 12, as indicated by arrow $D_o$. In other words, it provides a logic zero signal at its output in the absence of a fault in line section 11. A fault detected in line section 13 causes relay 67 to retain a logic zero output. A fault detected in line section 11 causes relay 67 to provide a logic one output signal.

In the operation of the relay system 10, a high impedance fault in line section 11, such as due to a fallen or broken conductor, will cause the directional relay 67 to provide a logic one signal, which is applied to the inverting input of AND gate 70, blocking the gate. Both of the ratio ground relays 60 and 60' will detect the high impedance fault and start the timing circuits 62 and 62". AND gate 70 will prevent the signal from ratio ground relay 60' from being applied to the time delay circuit 62'. Since the time T1 is less than the time T3, the time delay circuit 62 will time out first, causing circuit breaker 52 to trip and isolate the fault located in line section 11 from the source 12. If circuit breaker 52 is not tripped for some reason, such as due to the fault actually being in line section 13 but undetected due to a malfunction in the directional relay 67 and/or in its associated logic circuitry, time delay 62'' will time out and trip circuit breaker 52'.

If the high impedance fault is in the line section 13, directional relay 67 will provide a logic zero to the inverting input of AND gate 70, and a signal from ratio ground relay 60' to start timing will be applied to the time delay circuit 62', which has the shortest delay time of the three time delay networks. Thus, circuit breaker 52' will be tripped to isolate the fault located in line 13 from the source 12.

Figure 4:
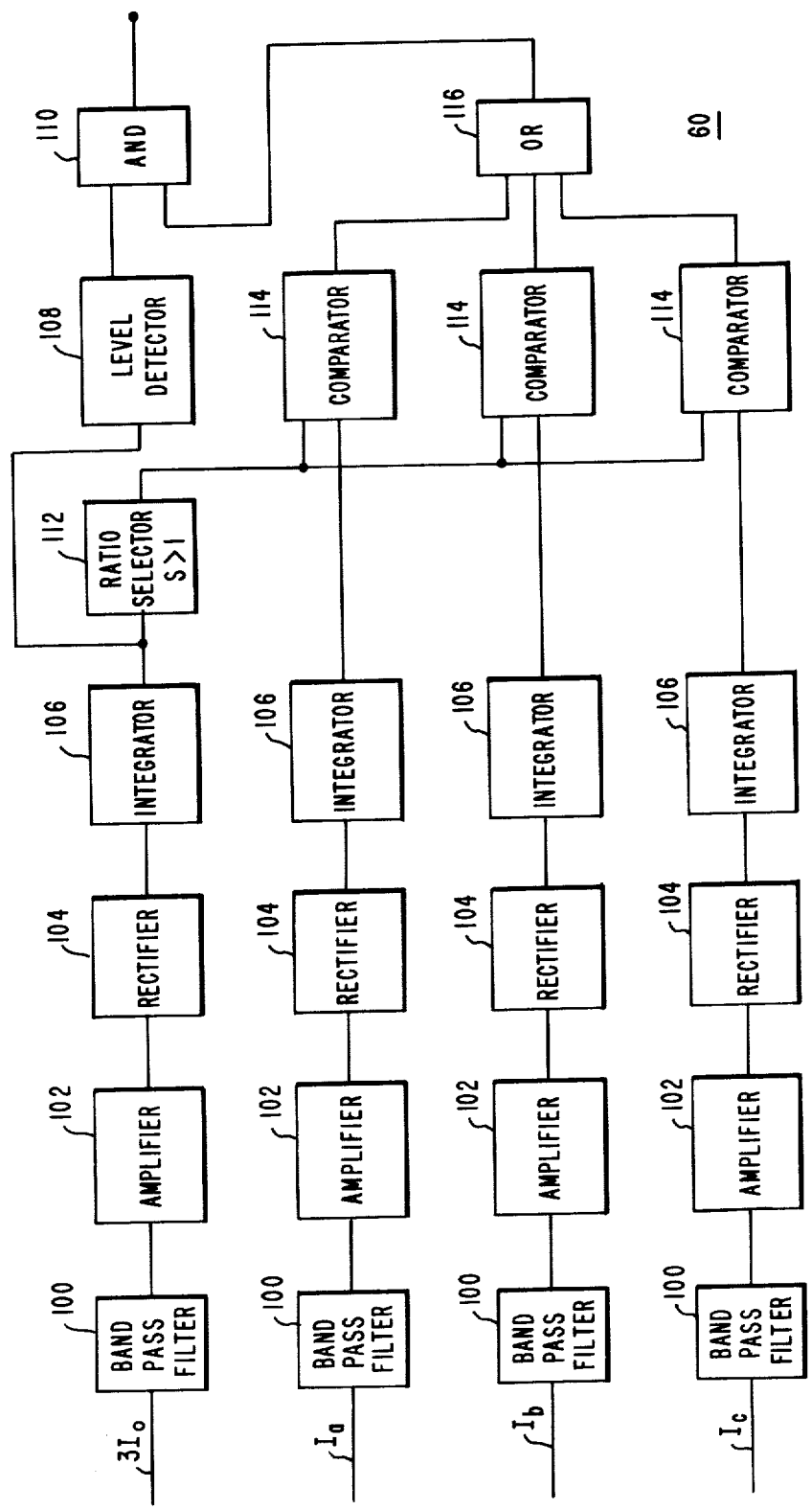
FIG. 4 is a detailed block diagram of a new ratio ground relay which may be used for the ratio ground relay shown in FIG. 1.

FIG. 4 is a detailed block diagram of a new ratio ground relay 60 which may be used for the ratio ground relays 60 and 60' shown in FIG. 1. The signal $3I_o$ responsive to the ground current is passed through a band pass filter 100 having a center frequency of 60 Hz. to remove transients therefrom, and the resulting signal is amplified an amplifier 102 and rectified in a full-wave rectifier 104, to obtain a D.C. voltage responsive to the level of the ground or zero sequence current. The rectified signal is passed through an integrator 106 to smooth the waveform. The band pass filter, amplifier, rectifier and integrator functions may all be provided by operational amplifiers. The resulting signal is applied to a comparator or level detector 108. The $3I_o$ signal is compared with a reference voltage in level detector 102, which is selected to represent M in FIG. 2, i.e., the minimum value of zero sequence current which is allowed to cause the ratio ground relay 60 to initiate timing. Level detector 108 may also be an operational amplifier with the output of the integrator 106 being applied to one input thereof, and a source voltage applied to the other input via an adjustable resistor. The resistor is adjusted to select the desired value of M. If the signal $3I_o$ does not exceed the signal M, the operational amplifier outputs a logic zero, and if it does, it outputs a logic one. The output of level detector 108 is applied to one input of a dual input AND gate 110. If the $3I_o$ current exceeds the selected value for M, the AND gate 110 is enabled. If the $3I_o$ current does not exceed a selected value for M, the AND gate 110 is blocked and relay 60 cannot provide a signal which will initiate trip timing.

The phase or line current signals $I_a$, $I_b$ and $I_c$ are each independently processed in a manner similar to the processing described relative to signal $3I_o$, up to and including the integrator 106. These functions for processing the phase current signals are thus given the same reference numerals and will not be explained in detail.

The processed $3I_o$ current signal is increased by a predetermined multiplier S (S>1) in a ratio selector 112. The output of the ratio selector 112 is compared with the level of each phase current, as derived from the outputs of the low pass filters 106, in comparators 114. If the signal responsive to the $3I_o$ current multiplied by S exceeds a signal responsive to any of the phase currents in comparators 114, the associated comparator 114 will output a logic one signal. If the $3I_oS$ signal is less than the phase current responsive signals, the comparators 114 will output a logic zero signal. The outputs of the comparators 114 are applied to an OR gate 116, and the output of OR gate 116 is applied to the remaining input of AND gate 110. Thus, if the $3I_o$ current exceeds the predetermined minimum level M, the AND gate 110 is enabled, and if the $3I_oS$ current exceeds any line current, AND gate 110 outputs a logic one signal, to initiate timing.

Tripping occurs when $3I_oS$ equals or exceeds any phase current I ($3I_oS \geq I$), assuming that $3I_o$ exceeds the minimum magnitude M. This relationship may also be written $3I_o \geq I/S$, indicating that instead of increasing $3I_o$ by S, that each phase current may be reduced by $1/S$ for comparison with $3I_o$.

Figure 5:
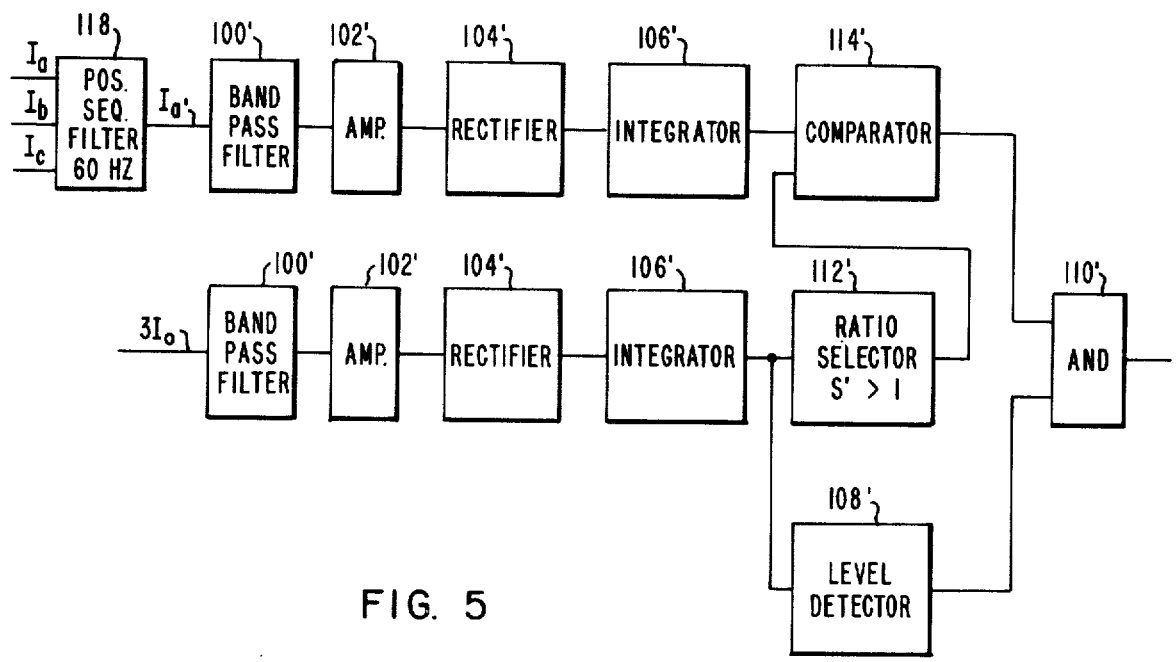
FIG. 5 is a detailed block diagram of another new ratio ground relay arrangement which may be used for the ratio ground relay shown in FIG. 1.

FIG. 5 is a detailed block diagram of an alternative embodiment of the invention for the ratio ground relay 60. Instead of comparing the $3I_o$ current with each phase current, this alternative embodiment develops a positive sequence current component $I_a$, responsive to the three phase currents $I_a$, $I_b$ and $I_c$. The positive sequence current component $I_{a'}$ is compared with the $3I_o$ current, thus requiring only one comparison, instead of three, which substantially reduces the hardware required. The $3I_o$ current is increased by the ratio S', where $S' > 1$, or the positive sequence current component may be reduced by $1/S'$, before the comparison is made. The ratio is referenced to as S', as it will be different than the ratio S used in the first embodiment, for equivalent minimum trip sensitivity, assuming substantially balanced load currents for the unfaulted phases.

More specifically, the three line currents $I_a$, $I_b$ and $I_c$ are connected to a positive sequence filter 118, such as one formed of operational amplifiers, which produces the positive sequence current component $I_{a'}$. This signal is passed through a band pass filter 100' to remove transients, it is amplified in amplifier 102', rectified in rectifier 104', its waveform is smoothed in integrator 106', and the resulting signal is applied to one input of comparator 114'.

The $3I_o$ current is processed in the same manner as the FIG. 4 embodiment, with the ratio selector 112' increasing its magnitude by S' instead of S. If the $3I_o$ current exceeds the minimum M, determined in level detector 108', the level detector enables AND gate 110' by applying a logic one to one of its two inputs. If the magnitude of $3I_oS'$ equals or exceeds $I_{a'}$, determined by comparator 114', the comparator 114' outputs a logic one to the remaining input of AND gate. When both the level detector 108' and comparator 114' output logic one signals, AND gate 110' outputs a logic one signal to initiate the trip timing described relative to FIG. 1.

Figure 6:
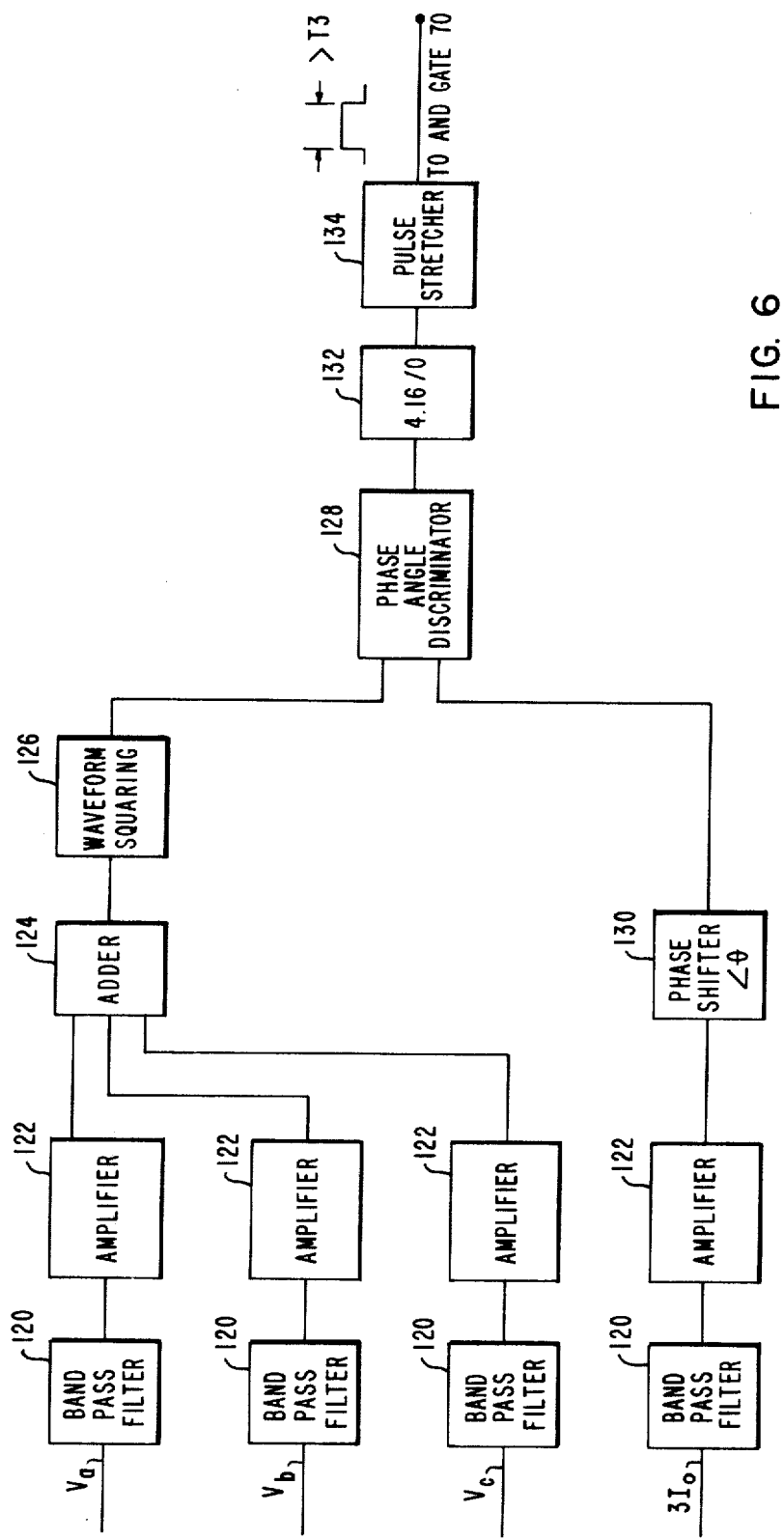
FIG. 6 is a detailed block diagram of a zero sequence directional relay which may be used for the directional relay shown in FIG. 1.

FIG. 6 is a detailed block diagram of a directional relay 67, which may be used for the zero sequence directional relay 67 shown in FIG. 1. The voltages $V_a$, $V_b$ and $V_c$ representing the line voltages, and the voltage $3I_o$ representing the zero sequence current, are each passed through a band pass filter 120 and amplified in amplifiers 122. The amplified signals responsive to the line voltages are added in adder means 124, such as in an operational amplifier, or in a resistive adding network. If the voltages are balanced, the sum will be zero. If there is an open conductor or high impedance fault, the sum will represent the zero sequence component of the polyphase voltage. The waveform of any zero sequence voltage appearing at the output of adder 124 is squared in a waveformm squaring circuit 126, and the output of the waveform squaring circuit 126 is applied to a phase angle discriminator 128.

Figure 3:
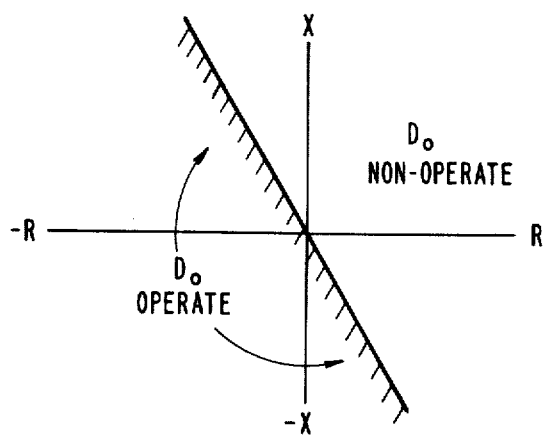
FIG. 3 is a graph which illustrates the operating characteristic of the zero sequence directional relay shown in FIG. 1.

The amplified signal $3I_o$ responsive to the zero sequence current is applied to a phase shift network 130, with the amount of phase shift being selected according to the desired slope of the characteristic curve shown in FIG. 3. The phase shifted signal is applied to the phase angle discriminator 128. The phase shift network 130 may use an operational amplifier, or it may be constructed according to the phase shift network shown in FIG. 2 of U.S. Pat. No. 3,295,019, which is assigned to the same assignee as the present application. The same U.S. Patent illustrates a waveform squaring circuit which may be used, but an operational amplifier may also be used, as desired.

The phase angle discriminator 128 may be a phase sensitive rectifier wherein the phase of the line voltage signal gates the signal responsive to the zero sequence current through one of two circuits, one of which provides a negative output, and the other of which provides a positive output. The resulting signal is passed through a low pass filter to provide a positive or negative unidirectional voltage which, in turn, is applied to a level detector to provide a logic zero signal when the input is negative, and a logic one signal when the input signal is positive.

Instead of being responsive to the flow direction of zero sequence current, the phase angle discriminator 128 may be constructed to provide an output based on the flow direction of zero sequence power. In this instance, the waveform squaring circuit 126 may be eliminated, with the outputs of adder 124 and phase shifter 130 being multiplied in the phase angle discriminator 128. The result will be positive if the angle is in the first and fourth quadrants, and negative if the angle is in the second or third quadrants.

Another form of phase angle discriminator having a D.C. output indicating by its polarity the direction of power flow is shown in FIG. 2 of U.S. Pat. No. 3,312,864, which is assigned to the same assignee as the present application.

Regardless of the phase angle detection technique used, the phase angle discriminator 128 is arranged to provide a logic one signal if the flow direction of the zero sequence quantity indicates a fault in line section 11, and it is otherwise providing a logic zero signal. The logic one signal is applied to a timer circuit 132. If the logic one signal persists for a predetermined period of time, such as 4.16 milliseconds, it provides an output signal to a pulse stretching circuit 134, such as a monostable multivibrator or one-shot, which provides a logic one output signal of sufficient duration to block AND gate 70 long enough to allow time delay circuits 62 and 62" to operate.

In summary, there has been disclosed a new and improved protective relaying system which provides more sensitive ground fault protection, without nuisance tripping due to normal unbalanced load current. The load currents in the unfaulted phases provide the operating quantity for a ratio ground relay to detect an open in a faulted phase, even in the absence of any ground fault current. By properly setting the values of M and S, which may be set according to load studies for a particular distribution circuit, the disclosed protective relaying apparatus will discriminate between high impedance faults, such as might be caused by a broken or fallen conductor, and normal unbalanced load current.

I claim as my invention:

1. Protective relaying apparatus for detecting and clearing high impedance faults on a polyphase electrical distribution circuit, comprising:

a polyphase source of alternating potential,
a polyphase distribution circuit,
a load circuit,
a first circuit breaker for controlling the connection of the distribution circuit to the source,
a second circuit breaker for controlling the connection of the distribution circuit to the load circuit,
first and second ratio ground relays at the first and second circuit breakers, respectively, for tripping the associated circuit breaker after a predetermined delay time when the ratio of zero sequence current to a predetermined phase current related quantity indicates a fault condition,
an a zero sequence directional relay at the second circuit breaker for coordinating the first and second ratio ground relays by adjusting the trip delay time of the second circuit breaker relative to the trip delay time of the first circuit breaker, in response to the flow direction of a zero sequence quantity at the second circuit breaker.

2. The protective relaying apparatus of claim 1 wherein the ratio ground relays discriminate between an unbalanced load and a high impedance fault by being responsive to the magnitude of the zero sequence current, with a predetermined minimum magnitude being required to initiate delay timing, and with the magnitude required to initiate delay timing being increased by the predetermined phase current related quantity according to a ratio setting of the relay.

3. The protective relaying apparatus of claim 1 wherein the first ratio ground relay includes delay means which requires that the detected fault current persist for a time T1 before tripping the first circuit breaker, and the second ratio ground relay includes delay means which is responsive to the zero sequence directional relay, tripping the second circuit breaker when a fault on the load side persists for a time T2, which is shorter than time T1, and tripping the second circuit breaker when a fault on the source side persists for a time T3, which is longer than time T1.

4. The protective relaying apparatus of claim 1 wherein the predetermined phase current related quantity is the minimum of the phase currents.

5. The protective relaying apparatus of claim 1 wherein the predetermined phase current related quantity is the positive sequence component of the phase currents.

6. Protective relaying apparatus for protecting line sections of a polyphase electrical distribution circuit against high impedance ground faults, and broken conductors which do not result in ground fault conditions, comprising:

a source of alternating potential,
first and second line sections,
first and second circuit breakers for controlling the connection of the first line section to the source, and the second line section to the first, respectively,
first and second ratio ground relays responsive to the magnitudes of the phase currents and the zero sequence currents at the first and second circuit breakers, respectively, providing first and second output signals, respectively, when the zero sequence current exceeds a magnitude determined by a selected minimum magnitude, a selected ratio setting of the relay, and the magnitude of a phase current related quantity.
first time delay means responsive to the first output signal, providing a trip signal for said first circuit breaker when the first signal persists for a time T1,
second and third time delay means responsive to the second output signal, said second and third time delay means providing trip signals for the second circuit breaker when the second output signal persists for times T2 and T3, respectively, with times T1, T2 and T3 being selected to have the relationship $T3>T1>T2$, and a directional relay responsive to the flow direction of a zero sequence quantity at the second circuit breaker, said directional relay selecting the delay time T2 or T3 according to the flow direction of said zero sequence component, with the delay time T2 being selected when the flow direction indicates a fault in the second line section, and with delay time T3 being selected when the flow direction indicates a fault in the first line section.

7. The protective relaying apparatus of claim 6 wherein each ratio ground relay compares the zero sequence current with each phase current, providing an output signal when the zero sequence current exceeds the selected minimum magnitude, and a predetermined percentage of the minimum of the phase currents.

8. The protective relaying apparatus of claim 6 wherein each ratio ground relay compares the zero sequence current with the positive sequence component of the phase currents, providing an output signal when the zero sequence current exceeds the selected minimum magnitude, and a predetermined percentage of the positive sequence component of the phase currents.

* * * * *